(12) United States Patent
Carson et al.

(10) Patent No.: US 7,013,348 B1
(45) Date of Patent: Mar. 14, 2006

(54) SWITCH SUBTENDING IN A SYNCHRONOUS TRANSMISSION SYSTEM

(75) Inventors: Mark Carson, Belfast (GB); David M. Goodman, St. Albans (GB)

(73) Assignee: Nortel Networks Limited, St. Laurent (CA)

( * ) Notice: Subject to any disclaimer, the term of this patent is extended or adjusted under 35 U.S.C. 154(b) by 774 days.

(21) Appl. No.: 10/032,412

(22) Filed: Dec. 21, 2001

(51) Int. Cl.
*G06F 15/173* (2006.01)

(52) U.S. Cl. .............................. 709/238; 370/542

(58) Field of Classification Search ................ 709/232, 709/236, 238, 246, 242; 370/378, 473, 509, 370/907, 216, 248, 250, 278, 300, 348, 361, 370/369, 395, 430, 465–467, 538–543
See application file for complete search history.

(56) References Cited

U.S. PATENT DOCUMENTS

| 5,282,206 A | * | 1/1994 | Ishihara et al. | 370/509 |
|---|---|---|---|---|
| 5,457,681 A | * | 10/1995 | Gaddis et al. | 370/402 |
| 5,526,351 A | * | 6/1996 | Mochinaga et al. | 370/399 |
| 5,640,399 A | * | 6/1997 | Rostoker et al. | 370/392 |
| 5,802,287 A | * | 9/1998 | Rostoker et al. | 370/395.5 |
| 5,815,501 A | * | 9/1998 | Gaddis et al. | 370/402 |
| 5,923,384 A | * | 7/1999 | Enomoto et al. | 348/705 |
| 5,974,027 A | * | 10/1999 | Chapman | 370/228 |
| 6,014,708 A | * | 1/2000 | Klish | 709/232 |
| 6,393,025 B1 | * | 5/2002 | Merritt | 370/395.6 |
| 6,801,496 B1 | * | 10/2004 | Saleh et al. | 370/221 |
| 6,820,159 B1 | * | 11/2004 | Mok et al. | 710/305 |
| 6,836,486 B1 | * | 12/2004 | Carson et al. | 370/542 |
| 6,850,486 B1 | * | 2/2005 | Saleh et al. | 370/218 |
| 6,856,627 B1 | * | 2/2005 | Saleh et al. | 370/397 |
| 2002/0114348 A1 | * | 8/2002 | McCrosky et al. | 370/465 |
| 2004/0076166 A1 | * | 4/2004 | Patenaude | 370/401 |
| 2005/0041575 A1 | * | 2/2005 | Kam et al. | 370/216 |
| 2005/0099941 A1 | * | 5/2005 | Sestito et al. | 370/228 |

* cited by examiner

*Primary Examiner*—Bunjob Jaroenchonwanit
(74) *Attorney, Agent, or Firm*—Barnes & Thornburg LLP (57) ABSTRACT

The invention concerns a switching apparatus comprising a low order switch subtended from a high order switch. In order to compensate for delays incurred by passing a data frame through the high order switch to the low order switch and delays incurred by the operation of the low order switch, the apparatus is arranged to advance the payload of a received data frame with respect to the fixed overhead of the data frame by an amount corresponding to the incurred delays. The low order switch uses the advanced payload to create an output frame, for sending to the high order switch, which is advanced with respect to the data frame that it receives. The apparatus, which is particularly suitable for use in SDH and/or SONET systems, obviates the need to provide an alignment apparatus, such as a VT/TU aligner between the high order switch and the subtended low order switch.

22 Claims, 5 Drawing Sheets

SWITCH SUBTENDING IN A SYNCHRONOUS TRANSMISSION SYSTEM

FIELD OF THE INVENTION

The present invention relates to switch subtending in a synchronous transmission system. In particular, the invention relates to the subtending of a low order switch from a high order switch.

BACKGROUND TO THE INVENTION

In a synchronous transmission system or network, data traffic takes the form of synchronous data signals normally comprised of data frames. Data traffic is normally transported in high order or low order data structures, where a high order structure may contain more than one low order structure. For example, in an SDH (Synchronous Digital Hierarchy) system, data is normally carried in structures known as Virtual Containers (VCs) which may be high order, for example a VC-4, or low order, for example a VC-11 or VC-12. A VC-4 may comprise, for example, 63 VC-12s or, say, 2 low order VC-3s and 21 VC-12s. The Virtual Containers are transported across a network in frames known as STM (Synchronous Transport Module) frames where, for example an STM-1 frame transports a VC-4 at a transmission rate of 155.52 Mbit/s. Similarly, in a SONET (Synchronous Optical Network) system, data may be carried in high order structures known as STSs (Synchronous Transport Signals) or low order structures known as VTs (Virtual Tributaries). By way of example, a SONET STS-3 (155.52 Mbit/s) is comparable with an SDH STM-1 and may comprise 3 STS-1s (51.84 Mbit/s). An STS-1 may comprise 21 VT2s, where VT2s are comparable with SDH VC-12s.

In SDH networks, it is necessary for a switching element to be able to control data payloads at the high order level (e.g. at STS or VC-4 level) and desirable for it to be able to control payloads at the low order level (e.g. at VT or VC-12 level). For convenience, SONET terminology will be used primarily hereinafter. For example, high order switching is referred to as STS switching, and a high order switch is referred to as an STS switch, while low order switching is referred to as VT switching and a low order switch is referred to as a VT switch. Similarly, a low order alignment apparatus is referred to as a VT aligner. It will be understood however that the invention applies equally to equivalent SDH, and other, structures and apparatus (e.g. TU switching and TU alignment).

In previous generations of products (STM-1/STM-4 in ETSI), it has been normal for equipment to support full VT switching i.e. to be able to manage payloads down to the VC-12 (2 Mbit/s), or equivalent, level. However, with the rapid increase in the transmission rates used in SDH/SONET networks (to STM-64 and STM-256) it is no longer desirable, or in some cases practical, for network equipment to provide full VT switching. It is, however, still desirable for network equipment to be able to provide at least some VT switching. This is commonly known as partial VT switching.

One approach for providing partial VT switching is to subtend a VT switching apparatus from an STS switching apparatus. In such an arrangement, the STS switch passes to the VT switch only traffic comprising VT traffic that requires to be switched (where switching normally takes the form of timeslot interchanging and/or port interchanging) all other traffic being handled by the STS switch alone. This allows a less complicated version of the VT switching apparatus to be used than is needed for full VT switching. This is desirable since, in general, VT switching apparatus are relatively complex, expensive and operate at slower rates than STS switches.

A problem with subtending a VT switch in this way is that VT alignment is conventionally required between the STS switching apparatus and the VT switching apparatus in order to compensate for delays incurred in passing the traffic through the STS switching apparatus and the VT switching apparatus before it is routed back to the STS switching apparatus. A VT alignment apparatus is relatively expensive and adds significantly to the overall cost of the switching apparatus.

SUMMARY OF THE INVENTION

A first aspect of the invention provides an apparatus for switching data frames comprising payload data arranged in accordance with a normal frame structure, the apparatus comprising a first switching component for switching high order data structures; a second switching component for switching low order data structures, the second switching component being subtended from said first switching component; and adaptation apparatus for adapting each data frame received by the apparatus for switching data frames to a reference timing signal, wherein the adaptation apparatus is arranged to advance the payload data of a data frame with respect to its normal frame structure, and wherein the second switching component, during receipt of a data frame in respect of which the payload data has been so advanced, is arranged to generate an output data frame comprising said advanced payload data arranged in a normal frame structure so that said output frame is advanced with respect to the received data frame.

The output data frame from the second switch device is sent to the first switching component in normal manner. By generating an output frame that is advanced with respect to the received data frame, the second switching component is able to compensate for time delays incurred in passing a data frame through the first switching component and the second switching component. Moreover, the switching apparatus enables this to be achieved without the need for an alignment apparatus, such as a VT or TU aligner, between the high order switch apparatus and the low order switch apparatus.

In the preferred embodiment, the switching apparatus is arranged for operation with SDH and/or SONET data frames, and the first switch comprises an STS switch (or equivalent high order switch) and the second switch comprises a VT switch (or equivalent low order switch) modified in accordance with one aspect of the invention. The adaptation apparatus, which conveniently comprises a VT or TU aligner, is arranged to advance the payload data by advancing the position of the, or each, low order pointer. Conveniently, the adaptation apparatus advances the, or each, low order pointer by adjusting the respective value of the, or each high order pointer.

In the preferred embodiment, the second switching component includes a plurality of data memories and is arranged to, in respect of a received data frame, write successive blocks of received data in sequence to said memories and, in order to create an output data frame, to read blocks of data in sequence from said memories, the respective sequences being such that while data is being written to one memory, data is being read from another memory, wherein the writing and reading of data to and from the memories is controlled by respective independent timing reference signals. More preferably, switch apparatus comprises a write pointer generator for controlling the writing of data blocks to said memories, and a read pointer generator for controlling the reading of data blocks from said memories, wherein the operation of said write pointer generator is controlled by a first timing reference signal and the operation of said read pointer generator is controlled by a second timing reference signal, the first and second timing reference signals being independent of one another. This allows the output frame to be created at a time independent of the arrival of the input frame.

A second aspect of the invention provides a synchronous transmission apparatus comprising a switching apparatus according to the first aspect of the invention.

A third aspect of the invention provides a synchronous transmission system, or network, comprising a switching apparatus according to the first aspect of the invention.

Preferably, the synchronous transmission system comprises a Synchronous Digital Hierarchy (SDH) and/or a Synchronous Optical Network (SONET) network.

A fourth aspect of the invention provides a method of switching low order data structures in a switching apparatus according to the first aspect of the invention, the method comprising: at the adaptation apparatus, advancing the payload data of a data frame with respect to its normal frame structure; and at the second switching component during receipt of a data frame in respect of which the payload data has been so advanced, generating an output data frame comprising said advanced payload data arranged in a normal frame structure so that said output frame is advanced with respect to the received data frame.

A fifth aspect of the invention provides an apparatus for switching low order data structures, the apparatus being arranged to receive an input data frame comprising payload data and to generate an output data frame comprising payload data, wherein the apparatus further includes a plurality of data memories and is arranged to, in respect of a received data frame, write successive blocks of received payload data in sequence to said memories and, in order to create an output data frame, to read blocks of payload data in sequence from said memories, the respective sequences being such that while data is being written to one memory, data is being read from another memory, wherein the writing and reading of data to and from the memories is controlled by respective independent timing reference signals.

The invention also provides a computer program product comprising computer useable instructions for implementing, in whole or in part, the switching apparatus of the first aspect of the invention, the method of the fourth aspect of the invention and/or the switching apparatus of the fifth aspect of the invention. The computer useable instructions may take the form of computer program code for execution by a computer or computer system, or hardware description language (HDL) instructions for synthesising hardware using conventional hardware synthesis tools.

Preferred features of the invention are recited in the dependent claims. Other advantageous aspects of the invention will become apparent to those ordinarily skilled in the art upon review of the following description of a specific embodiment of the invention and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
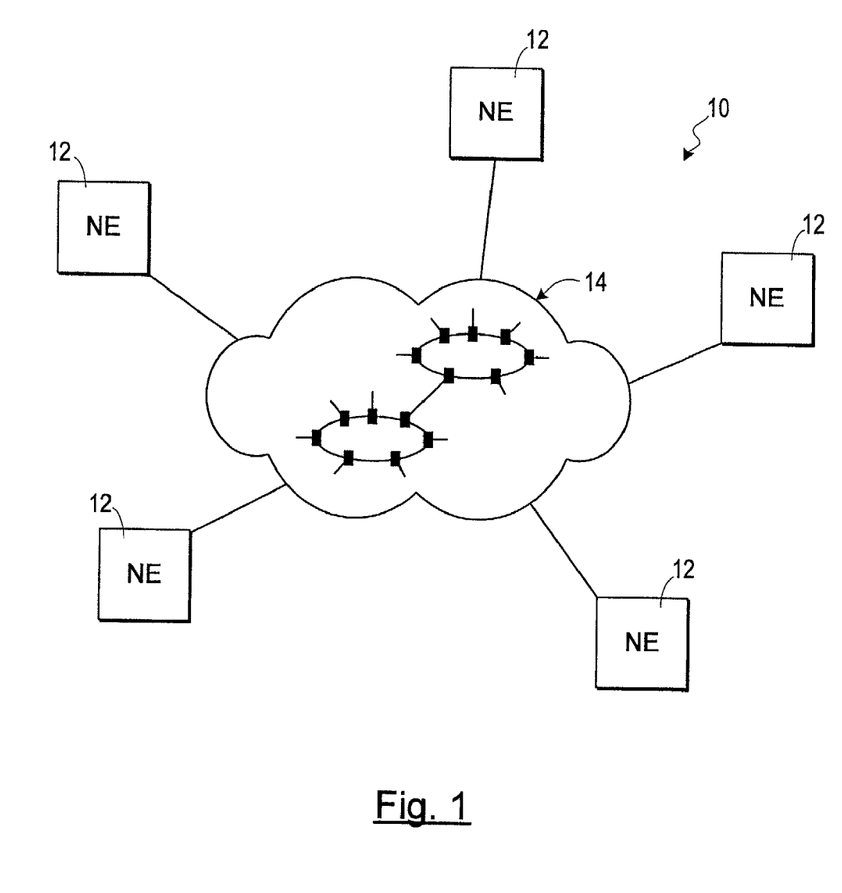
FIG. 1 is a schematic view of a synchronous transmission system.

FIG. 1 of the drawings shows, generally indicated at 10, a synchronous transmission system or network. The network 10 comprises a plurality of network elements 12 in communication with one another via a network infrastructure 14. The network infrastructure 14 may comprise further network elements or nodes, and/or sub-networks, arranged in conventional network configurations such as ring configuration, hub configuration, point-to-point configuration, or a combination thereof. The network elements typically comprise synchronous transmission apparatus such as a multiplexer, a regenerator or a cross-connect (not shown). The network 10 may, for example, comprise a SONET and/or SDH network.

Many of the network elements 12 in the network 10 will be required to perform some switching of data traffic. To this end, the synchronous transmission apparatus comprise switching apparatus (not shown in FIG. 1). Normally, switching apparatus fall into two categories: those that switch high order data structures e.g. those that can process data traffic with a granularity of STS-1s (or equivalent structure); and those that can switch low order data structures e.g. those that can process data traffic having VT (or equivalent) granularity. Analysis of future network requirements indicates that partial VT switching will be required. This entails providing a switching apparatus with the ability to switch all data traffic at STS level and some of the traffic at VT level. One means of providing partial VT switching is through the use of a VT switching apparatus subtended from a STS switching apparatus.

Figure 2:
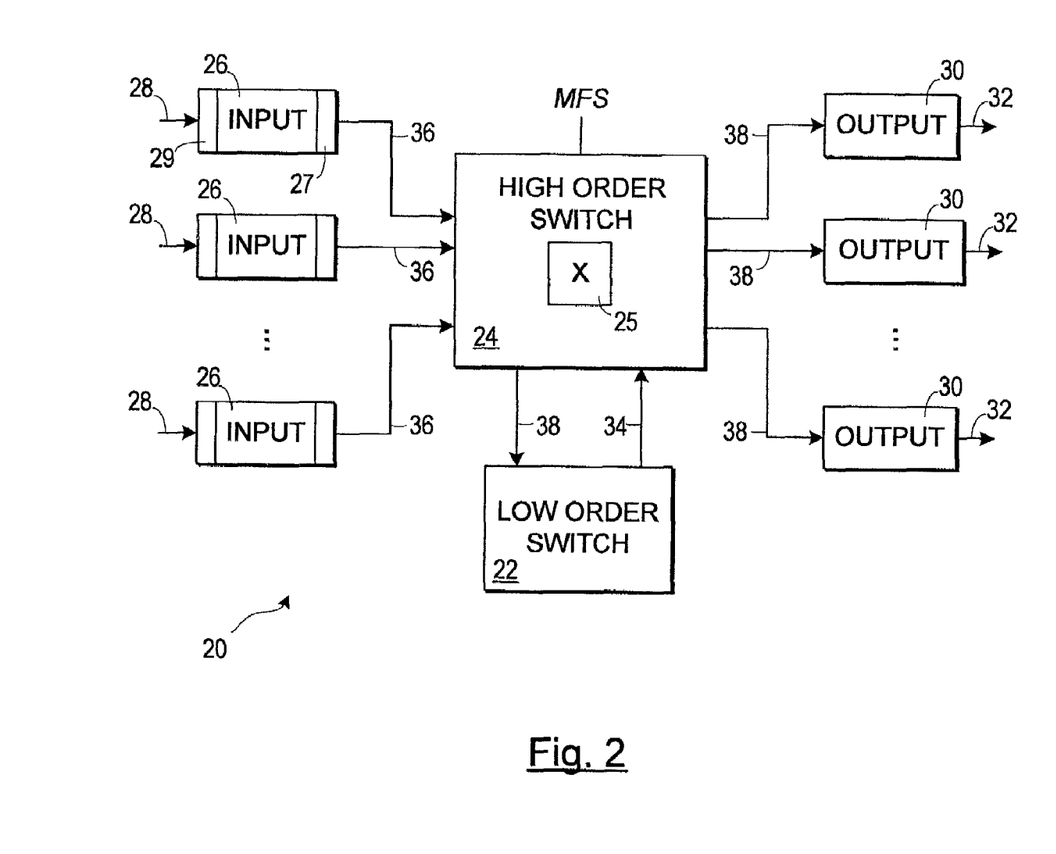
FIG. 2 is a schematic view of a synchronous transmission apparatus which includes a low order switch subtended from a high order switch.

FIG. 2 shows in schematic form a synchronous transmission apparatus 20 comprising a switching apparatus which in turn comprises a low order switching component, or function, in the form of a VT switch 22, subtended from a high order switching component, or function, in the form of an STS switch 24, which has a switch core 25. The synchronous transmission apparatus 20 further includes a respective input card 26 for each input line 28 and respective output card 30 for each output line 32. The input cards 26 each correspond with a respective port of the apparatus 20 and are arranged to align, or adapt, incoming data traffic at the respective port to the local timing reference, or synchronization signal (commonly known as MFS (Multi-frame synch)) i.e. the local timing reference of the network element or node that comprises the synchronous transmission apparatus 20. The input cards 26 include means for implementing what is commonly referred to as an input function. In SDH/SONET systems, the input function normally includes an adaptation function (or alignment function) for adapting an incoming data frame to a reference data frame structure determined by the local timing reference. The adaptation function includes low order pointer processing operations as defined in applicable standards such as the International Telecommunications Union Telecommunications Standardization Sector (ITU-T) standard G707 and Bellcore standard GR253. Low order pointer processing operations are normally implemented by a low order pointer processor (LOPP). The adaptation, or alignment, of low order data structures, including low order pointer processing, is commonly implemented by an alignment apparatus, or adaptation apparatus, commonly known as a VT or TU aligner, which is normally included in the input card 26 (indicated at 27 in FIG. 2). In SDH/SONET systems, the input function also normally includes a high order pointer processor (HOPP) 29 for performing high order pointer processing operations also defined in aforementioned standards. The HOPP 29 is also normally included in the input card 26. The output cards 30 also correspond with a respective port and are responsible for placing switched data traffic back onto the network 10 or to an end user or other network element (not shown). Typically, an input card and an output card are provided on the same physical device, commonly known as an I/O card or port card.

There is a problem in trying to implement a switching arrangement of the general type shown in FIG. 2 by conventional means. The normal arrangement of VT and STS switches is that, when incoming data is received by a switch, it is written into an internal memory, stored for a period of time, and then read from the memory. In a typical implementation, a switch treats the data traffic as blocks of a fixed size (e.g. 63 byte blocks in SDH when switching VC-12s at STM-1), and for an equal number of clock cycles the switch writes received data into a first memory, and reads data from a second memory (the read data comprising the output from the switch). At the end of this period, data has been written to all allocated memory locations in the first memory, and all necessary locations in the second memory have been read. At this point, the respective functions of the memories are reversed so that the next incoming data is written to the second memory while the data stored in the first memory is now read for outputting. Other factors contributing to the delay between an input card 26 and output card 30 include transit delays through the switching apparatus as a result of FIFOs and pointer processing apparatus.

As a consequence, VT and STS switches necessarily introduce a delay between a data frame structure being received at an input of the switch and a data frame structure being delivered on an output of the switch. This creates a problem when constructing a switching apparatus of the type shown in FIG. 2. In the arrangement shown in FIG. 2, the output 34 of the VT switch 22 serves as an input to the STS switch 24. As such, the VT switch 22 should provide data to the STS switch 24 on the same timing as the other inputs 36 to the STS switch 24. However, this cannot normally happen using the arrangement of FIG. 2 since both the STS switch 24 and the VT switch 22 introduce a delay to an incoming signal. Hence, a data frame provided to the STS switch 24 from the output 34 of the VT switch 22 would arrive at the STS switch 24 a number of clock cycles after it was required. For example, in an STM-1/STS-3 system, assume that the switch core 25 operates at MFS timing, i.e. with a zero offset. Assume also that a data frame output from the STS switch 24 has an offset of +30 clock cycles with respect to MFS as a result of the time taken to be processed by the switch core 25 and be delivered to a output 38 of the STS switch 24. Assume further that a data frame takes 40 clock cycles to pass from an input card 26 to the switch 24 and a further 20 cycles to pass from the input of the switch 24 to the switch core 25 (i.e. assuming that the switch core 25 operates at MFS, a data frame must arrive at the switch 24 at −20 cycles with respect to MFS). For the STS switch 24 to work correctly, the data frame must be supplied to it before it is needed on the output. In this example, the data frame provided to the STS switch 24 must be 50 clock cycles in advance of the output data frame, i.e. the relevant input card 26 must ensure that each data frame it receives is re-aligned to be 60 clock cycles (in the present example only) in advance of MFS before being sent to the STS switch 24 on an input line 36. This re-alignment operation (normally known as high order (HO) alignment or high order pointer processing) comprises conventional pointer processing operations and each input card 26 therefore includes conventional alignment, or pointer processing, apparatus (not shown) for this purpose (typically the HOPP described above).

However, the VT switch 22 also produces a delay between an input frame and a corresponding output frame. Each data frame that is sent from an input 36 of the STS switch 24, through the STS switch 24, then through the VT switch 22 and back to the STS switch 24 via output 34 is delayed a number of clock cycles (50 cycles in the example) in passing through the STS switch 24 and then a further number of clock cycles, say 200 cycles, by the VT switch 22. Hence, at the VT switch output 34 the data frame is 250 clock cycles later than is required for normal operation of the STS switch 24 (i.e. the data frame is at +230 clock cycles delay with respect to MFS whereas it is required to be 20 clock cycles in advance of MFS).

The conventional method of addressing this problem is to introduce an alignment apparatus, commonly known as a VT aligner (not shown) or TU aligner, between the STS switch 24 and the VT switch 22. The VT aligner is arranged to re-align the frame structure between the VT and STS switches 22, 24 in order to compensate for delays introduced by the switches 22, 24. To do this, the VT aligner breaks down an incoming high order signal, for example a VC-4 or STS-1 SPE, into its constituent low order components (structures), for example VC-12s or VT2s, using conventional pointer processing operations, passes the low order components through a buffer (typically a FIFO (First-In First-Out memory)) and then reassembles them using a new frame structure with new timing. The pointers to the VC-12s/VT2s are adjusted to compensate for the change in the position of the frame. In this way, a data frame structure can be advanced to compensate for the delays caused by the switches 22, 24. However, a VT aligner is a relatively expensive piece of apparatus and it is desirable to reduce the number of these required by a given piece of equipment.

The present invention provides a solution that obviates the need for a VT aligner or equivalent alignment apparatus between the STS switch 24 and the VT switch 22. As described above, the problem that normally prevents a VT switch 22 from being connected directly to an STS switch 24 is that the frame output from the VT switch 22 and supplied to the STS switch 24 is output a number of clock cycles after it is needed by the STS switch 24. This problem may be overcome if the frame that is supplied to the VT switch 22 from the STS switch 24 is advanced by a predetermined number of clock cycles in order to compensate for the delays incurred in passing through the STS and VT switches 24, 22 so that the output from the VT switch 22 to the STS switch 24 occurs at the correct time. This cannot be achieved simply by advancing the whole input frame, as certain components of the frame, including the high order pointers and section/line overhead should occupy a fixed position in time with respect to the timing reference of the local node. Such components of the frame are known as fixed overhead. However, in accordance with the invention, the VT traffic (or other low order traffic) is advanced with respect to the frame so that the VT traffic arrives at the VT switch 22 advanced by an appropriate number of clock cycles to compensate for switch delays. In the preferred embodiment, this is achieved by adjusting the high order pointer values (e.g. the AU-4 pointers in SDH or the STS-1 pointers in SONET) to relocate the position of the low order pointers (e.g. the TU pointers or VT pointers). The resulting frame structure does not correspond to the structure expected by a conventional VT (or TU) switch but, with a small amount of modification as described below, a VT (or TU) switch can be arranged to accept the modified frame structure.

Figure 3:
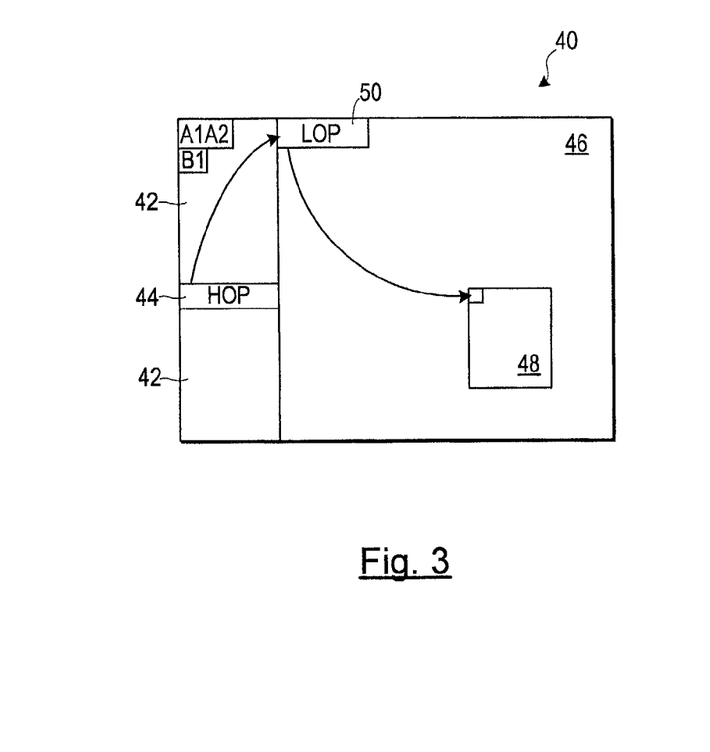
FIG. 3 shows a representation of a conventional data frame.

FIG. 3 shows a representation of a conventional data frame 40 such as an STM-1 frame (SDH) or an STS-3 frame (SONET). The frame 40 comprises overhead 42, such as section overhead (SDH) or transport overhead (SONET), one or more high order pointers HOP 44, such as AU-4/STS-1 pointers, and a payload area 46. Overhead 42 is fixed overhead in that it maintains a fixed position in time with respect to the local timing reference for a network node processing the frame 40. The payload area 46 comprises payload data in the form of one or more high order data structures (such as VC-4s or STS-1 SPEs) which in turn contain one or more low order data structures 48, such as a VC-12 or a VT2, and one or more low order pointers 50, such as TU pointers or VT pointers. The value of a high order pointer 44 is set to locate the position of the, or each, low order pointer 50 within the payload 46. The value of the, or each, low order pointer 50 indicates the position of the, or each, low order data structure 48 (with respect to the low order pointer) within the payload area 46. Path overhead has been omitted from FIG. 3 for reasons of clarity.

It is common to set the value of the high order pointer 44 such that the corresponding low order pointer 50 is positioned, or occurs, at the beginning of the payload area 46 as shown in FIG. 3. To this end, in a conventional switching apparatus (not shown) the VT aligners within the input cards 26 are normally arranged to set the value of the high order pointers to 522, 522 normally being the location at the start of the payload area 46. It will be understood that low order pointers 50 need not necessarily be positioned at the start of the first row of the payload area 46 as shown in FIG. 3. For example, it is also known to position low order pointers at the beginning of row 4 of a payload—this is achieved by setting the corresponding high order pointer value to zero. The invention is described hereinafter in the context of a system wherein the low order pointer(s) are normally positioned at 522 (i.e. the beginning of the payload area 46) although it will be appreciated that the invention is also applicable for use in a system wherein the low order pointer(s) are normally positioned elsewhere in the payload area.

Figure 5:
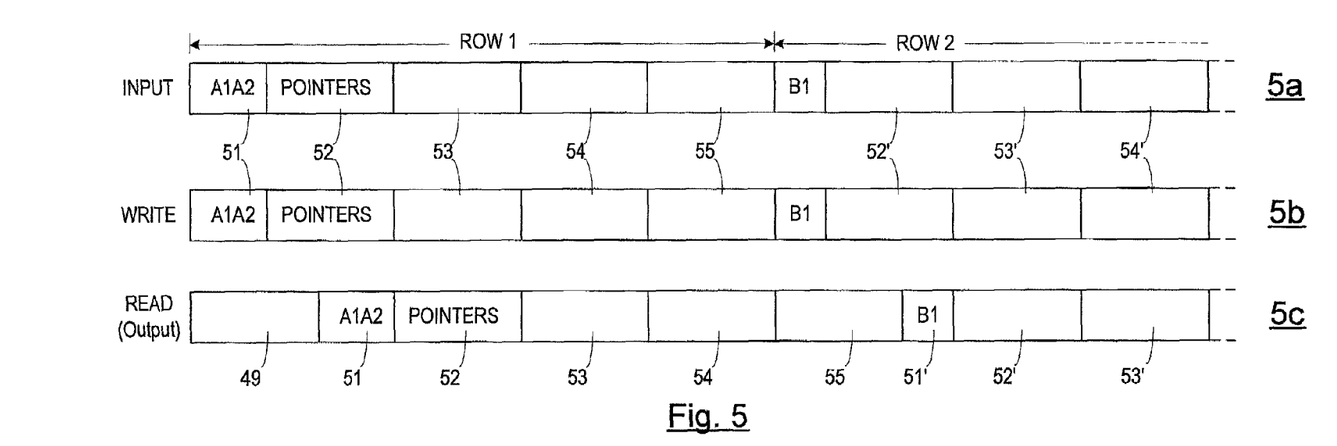
FIG. 5a shows a representation of the first row and part of the second row of the data frame of FIG. 3.
FIGS. 5b and 5c show how the components of the rows shown in FIG. 5a are written to and read from memory in a conventional low order switch.

FIG. 5 illustrates how a frame such as frame 40 is processed by a normal VT switch. FIG. 5 shows a first row, ROW1, and part of a second row, ROW2, of the frame 40 laid end-to-end for illustration purposes. Path overhead and part of the Section overhead have been omitted for clarity. For the same reason, the remainder of ROW2 and Rows 3 to 9 are not shown. FIG. 5*a* shows ROW1 and part of ROW2 as provided as an input to a VT switch. ROW1 begins with a block 51 of Section overhead (labelled as A1A2 to correspond with normal SDH terminology) or equivalent overhead, e.g. Transport overhead in SONET. Following the overhead block A1A2, there are four blocks or columns 52, 53, 54, 55 of payload. Taking, for example, the case where the frame 40 is an STM-1 frame comprising 63 VC-12s, then the first block 52 in each row carries the respective first byte of each of the 63 VC-12*s*, the second block 53 in each row carries the respective second byte of each of the 63 VC-12s, the third block 54 in each row carries the respective third byte of each of the 63 VC-12s and the fourth block 55 in each row carries the respective fourth byte of each of the 63 VC-12s. It will be appreciated that the size and arrangement of the blocks will vary depending on the structure of the frame 40. For example, for an STM-N frame, the block width is 63×N bytes, while for an STM-N carrying VC-11s, a row comprises three blocks, each block being 84×N bytes wide. It is assumed in the present example that the payload of frame 40 has been VT/TU aligned with a high order pointer that positions the low order (VT/TU) pointers at the beginning of the payload 46 (normally high order pointer value=522). Thus the low order pointers (50, FIG. 3) appear in the first block 52. In ROW2, blocks in corresponding positions are given like reference numerals 51', 52', 53', 54'.

FIG. 5*b* shows how the frame 40 is normally written into memory within the VT switch. As described above, a VT switch normally contains a first and second memory, the arrangement being that the data received by the VT switch is written in blocks alternately to the first memory and then to the second memory. Thus, in FIG. 5*b*, the first block 52 is written to the first memory, the second block 53 is written to the second memory, the third block 54 is written to the first memory, the fourth block 55 is written to the first memory and so on. The fixed overhead bytes A1A2 are framing, or synchronising, bytes and are not written to memory but can be used by the VT switch to detect or verify the position of the incoming payload. For example, for an STM-1 frame 40 comprising 63 VC-12s, the VT switch is able to determine, upon detection of the A1A1 bytes, where the start of the first block 52 is and knows to write the following 63 bytes of payload into the first memory, the subsequent 63 bytes of payload into the second memory, and so on. Similarly, the fixed overhead byte B1 byte is normally used for parity checks and is not written into memory.

FIG. 5*c* shows how the VT switch reads data from the first and second memory for output from the VT switch. While the VT switch writes to one of its memories, it reads from the other. Thus, for example, while the VT switch writes block 53 to the second memory, it reads the data of block 52 from the first memory. Then, while the VT switch writes block 54 to the first memory, it reads block 53 from the second memory, and so on (block 49 in FIG. 5*c* represents data read from the second memory in respect of an earlier received frame). The order in which the VT switch 22 reads bytes from a given memory need not necessarily be the same as the order on which the bytes were written into the memory—the reading order is determined by the switching operations that the switch 22 is required to carry out. Clearly, the VT switch cannot read data in respect of a given block until said data has been written into memory. Hence, the output frame from the VT switch is normally delayed by at least the number of clock cycles taken to read a block of payload data into one of the memories. In the present example, this delay is equivalent to the time taken to write a quarter of a row into memory—as can be seen from a comparison of FIGS. 5b and 5c. In practice, further delays are also incurred through the switch 22 due to, for example, pipeline delays.

To overcome the problem outlined above, and in accordance with one aspect of the invention, the payload, e.g. VC-4 or STS-1 SPE, of a data frame is advanced, before being provided to the VT switch 22, with respect to the fixed overhead. In particular, the advancement of the payload is such that the or each low order pointer occurs before the, or each, fixed overhead block or byte that would otherwise precede it in a normal frame structure. In the preferred embodiment, where the low order pointer(s) are normally positioned at the beginning of the payload area 46 (i.e. high order pointer value(s) set to 522), the preceding fixed overhead comprises framing blocks, e.g. A1A2 bytes in STM-1, or equivalent fixed overhead. Thus, the payload, and therefore the low order (VT/TU) traffic, is advanced so that the or each low order pointer occurs before the framing bytes, or equivalent fixed overhead.

Conveniently, this arrangement, or re-alignment, of the frame structure is performed during the VT/TU, or equivalent, alignment operation that is normally performed when a frame is received by the switching apparatus 20. In the case of the apparatus 20 shown in FIG. 2, the VT/TU alignment operation is performed by the respective VT/TU aligners 27 (FIG. 2) included in the input cards 26. Specifically, the VT/TU aligners are caused to perform VT/TU alignment to a position in advance of the normal alignment position (e.g. 522). This is achieved by causing the VT/TU aligners to set the, or each, high order pointer value to the advanced alignment position, thereby positioning the, or each, low order pointer at the advanced position. Moving the position of the, or each, low order pointer in this way causes associated payload to be advanced also, although there is no advancement of the fixed overhead. This arrangement of the frame structure is performed in addition to the re-alignment of the overall data frame performed by the HOPP in the input cards 26 as described above.

Figure 4:
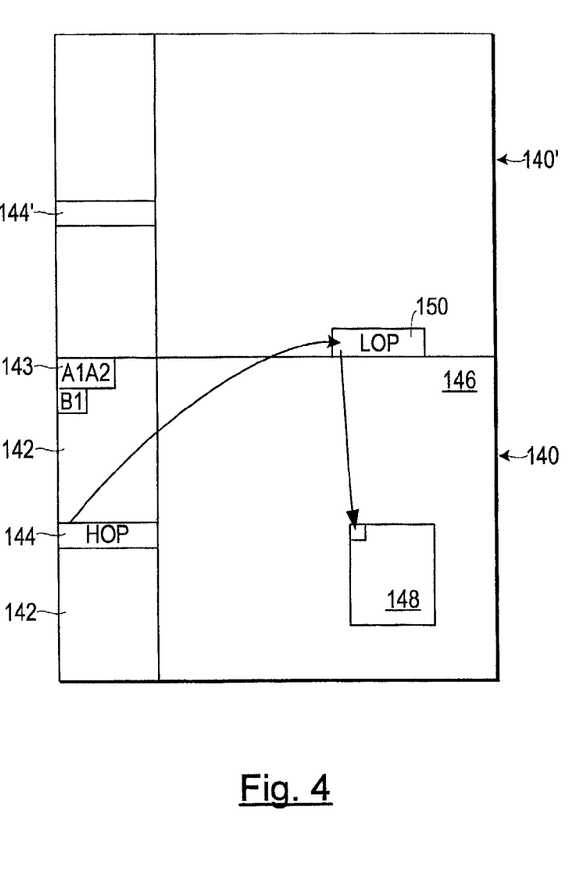
FIG. 4 shows a representation of a data frame modified in accordance with one aspect of the invention.

FIG. 4 shows a representation of a frame 140 which is generally similar in structure to the frame 40 of FIG. 3. However, the high order pointer 144 is set to locate the, or each, low order pointer 150 to a position that is in advance of the section overhead 142 for the frame 140. In the example of FIG. 4, it is assumed that the frame 140 is an STM-1 frame carrying a payload of 63 VC-12s and that the low order pointer 150 is 63 bytes wide and comprises 63 TU-pointers, one for each VC-12. Each TU-pointer comprises four bytes, commonly known as V-bytes (V1, V2, V3, V4) that are provided one byte at a time over a four frame multi-frame. The values to which the TU-pointers 150 are set correspond with the position of the respective VC-12 148 with respect to the TU-pointer. In this example, the first bytes of the first row in the section overhead 142 are the A1A2 framing bytes 143.

To achieve the proposed frame structure arrangement, the high order pointer 144, which in this example comprises an AU-4 pointer, is set so that the TU-pointers 150 occur before the A1A2 framing bytes 143, as illustrated in FIG. 4. This effectively means that the TU-pointers 150 of frame 140 are located in the previous frame 140'. Thus, the low order structures (in the present example VC-12s) are aligned with low order pointers located in advance of the section overhead, and in particular the framing bytes. It is noted that the position of the VC-12s 148 within the frame 140 is unchanged in comparison with the conventional frame 40 (FIG. 3). Rather, it is the values of the high order and low order pointers 144, 150 that change in comparison to the frame structure 40. For VC-12, or VT, traffic, the frame structure shown in FIG. 4 can be effected by causing the VT/TU aligners in the input cards 26 to set the high order (AU-4) pointer 144 to a value within the approximate range 400 to 500 (as opposed to 522 which is normal) during VT/TU alignment of received traffic signals. This sets the location of the TU-pointers 150 and the values of the TU-pointers 150 are then calculated in normal manner depending on the position of the respective VC-12s in the frame 140. The amount by which the payload needs to be advanced (and therefore the value to which the high order pointer 144 should be set) depends on the amount of delays that a data frame encounters in travelling through the STS switch 24 and the VT switch 22. These delays are usually known parameters of the switching apparatus 20. For example, if it is assumed that the delay through the STS switch 24 is 10 cycles, the delay through the VT switch is 70 cycles, and the value to which the high order pointer 144 is normally set is 522, then to implement this aspect of the invention the VT/TU aligner of the input card 26 is arranged to set the value of the high order pointer 144 to 522−10−90=422 in order to advance the payload by the required amount.

The frame arrangement described above and exemplified in FIG. 4, means that the low order pointers 150 of a given frame are received, by subsequent components of the switching apparatus 20, before the section/transport overhead for that frame. Similarly, in subsequent rows of the frame advanced potions of the payload will be received before the fixed overhead associated with the respective rows. In FIG. 2, the proposed alignment is performed on frames carrying low order data structures by the input cards 26 (in particular by the VT/TU aligner or other alignment apparatus) and the frames are then sent to the VT switch 22 via the STS switch 24.

It will be understood that the representations of data frames in FIGS. 3 and 4, and in particular the arrows showing how high order pointers point to low order pointers, are presented in a manner intended to illustrate clearly one aspect of the invention. In practice, SDH/SONET pointers only point forward and not backwards as shown in FIGS. 3 and 4. Thus, the high order pointers that point to the low order pointers 50 in data frame 40 (FIG. 3) would, in reality, belong to the data frame (not shown) that precedes the data frame 40. Similarly, the high order pointers pointing to the low order pointers 150 of data frame 140 are, in reality, the high order pointers 144' of the preceding data frame 140'.

It is noted that when the payload is normally located at the beginning of the payload area 46 (i.e. the low order pointers are positioned at 522, or equivalent position) as shown in FIG. 3, then when the payload is advanced as described above, part of the payload, including the low order pointers are moved to the preceding data frame (FIG. 4). However, this need not necessarily be the case. If the payload was normally positioned later in the payload area—for example if the low order pointers were positioned at, say, location zero—then after advancement, the payload may still be positioned within the same data frame, albeit advanced with respect to the fixed overhead of the frame.

Figure 6:
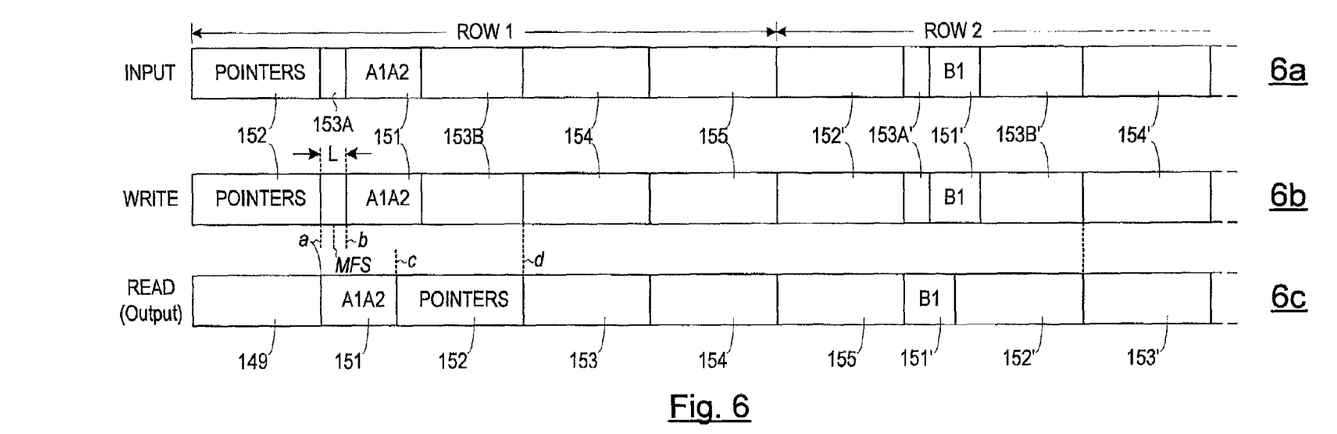
FIG. 6a shows a representation of the first row and part of the second row of the data frame of FIG. 4.
FIGS. 6b and 6c show how the components of the rows shown in FIG. 6a are written to and read from memory in a low order switch according to the invention.

FIGS. 6a to 6c illustrate how a frame, arranged in accordance with the invention, arrives at the VT switch 22. In a similar manner to FIGS. 5a to 5c, FIGS. 6a to 6c show the first row ROW1 and part of the second row ROW2 of a frame of the type shown in FIG. 4. At the start of ROW1 a first block 152 comprises the low order pointers 150. The next block is a sub-block 153A comprising payload data.

The following block 151 comprises fixed overhead, such as Section overhead or transport overhead which, in keeping with the example of frame 140 (FIG. 4), comprises the A1A2 framing bytes 143 in ROW1 and the B1 byte in ROW2 (block 151'). The next block is another sub-block 153B comprising more payload. After sub-block 153B, ROW 1 completes with two blocks 154, 155 of payload. It will be seen that ROW2 is similar in structure. Blocks 153A, 153A' and 153B, 153B' are referred to as sub-blocks since the combined size of each sub-block and its complement sub-block (e.g. 153A and 153B) is equal to the size of blocks 152, 152', 154, 154' and 155, 155' individually. It may therefore be said that sub-blocks 153A, 153A' and 153B, 153B' are two complementary parts of a normal payload block, separated by the respective overhead blocks 151, 151'.

Figure 7:
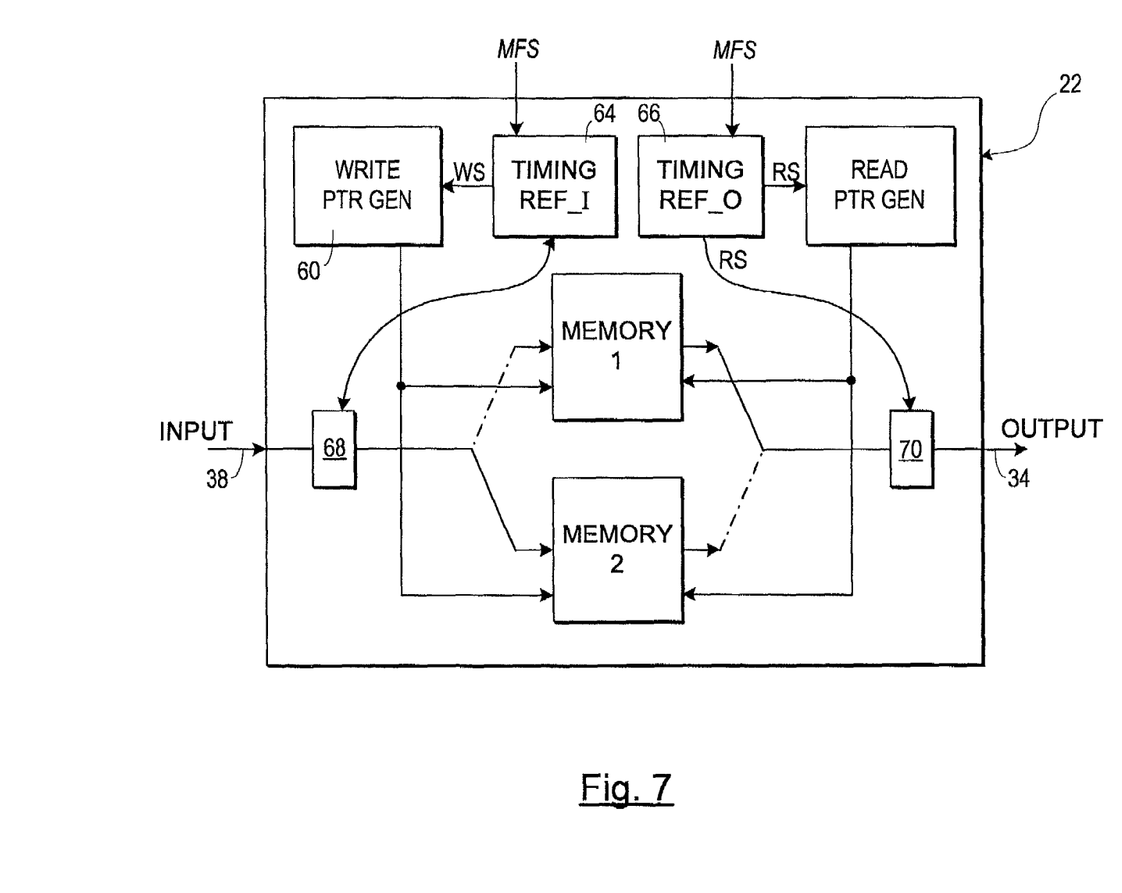
FIG. 7 is a schematic view of a low order switch arranged in accordance with one aspect of the invention and suitable for use in the apparatus of FIG. 2.

FIG. 7 shows a schematic view of a low order switch, such as the VT switch 22, arranged in accordance with the invention. Only those components of the switch 22 that are necessary for understanding the invention are shown. The low order switch 22 comprises a first memory MEMORY 1 and a second memory MEMORY 2 to and from which data can be written or read. As described above, at any one time, the switch 22 is arranged to write a block of data into one memory, say MEMORY 1, and to simultaneously read a block of data from the other memory, say MEMORY 2. At the end of a write/read cycle, the roles of the memories are reversed.

The switch 22 includes a write pointer generator 60 arranged to control the writing of data blocks to each memory in conventional manner, and a read pointer generator 62 arranged to control the reading of data blocks from each memory in conventional manner.

The switch 22 preferably also includes an input interface unit 68 (sometimes referred to as a "framer") arranged to monitor frames as they are input to the switch and to detect the, or each, framing byte (which in the present example are the framing bytes A1A2) and, upon detection of same to signal that a new frame has arrived.

The write pointer generator 60 operates in association with a timing reference apparatus 64. The timing reference apparatus 64 receives as an input signal MFS (or other system timing reference signal) in order that the operation of the write pointer generator 60 may be synchronised with the timing of the network node in which the switch 22 is located. The timing reference apparatus 64 supplies a timing reference signal, or write signal WS to the write pointer generator 60, upon receipt of which the write pointer generator 60 begins to write blocks of data received at the input to the switch 22 to one or other of the memories MEMORY 1, MEMORY 2. When the input interface unit 68 signals to the timing reference apparatus 64 that framing bytes have been detected, the timing reference apparatus 64 signals to the write pointer generator 60 which in turn controls the writing of subsequent bytes of the incoming frame into the memories MEMORY 1, MEMORY 2. For example, in the case where the switch 22 receives an input frame of the structure shown in FIG. 5a, wherein the frame is STM-1 and comprises 63 VC-12s, the write pointer generator 60 is arranged to write, in response to receiving a valid WS signal, the following 63 bytes of incoming data to, say, MEMORY 1, the next 63 bytes to MEMORY 2, the following 63 bytes to MEMORY 1, and so on. Normally, the write pointer generator 60, which typically comprises counters and Look-Up Tables (LUTs), is programmed in accordance with the type of data frame being processed—in this example an STM-1 comprising 63 VC-12s—so that data arriving at the switch 22 is written correctly into each memory.

In a conventional switch (not shown) the write and read pointer generators are controlled by a common timing reference such that the timing between write and read operations is fixed. In contrast, in switch 22 the write pointer generator 64 and the read pointer generator 66 are controlled by independent timing references, or reference signals i.e. the timing of and between write and read operations need not necessarily be fixed. In particular, the timing reference signal for controlling the generation of the output frame from the switch 22 is independent of the timing of the input frame to the switch 22. In the preferred embodiment, the switch 22 includes a second timing reference apparatus 66 for supplying a timing reference signal, or read signal RS to the read pointer generator 62, upon receipt of which read signal RS the read pointer generator is arranged to read data from MEMORY 1 or MEMORY 2 (as appropriate) according to the frame structure of the data being processed. The timing reference apparatus 66 also receives the MFS signal as an input so that its operation, and therefore the operation of the read pointer generator 62, is synchronised to the timing of the local network node. The switch also includes an output overhead generator 70 (comprising a framing apparatus or framer) arranged to generate overhead bytes, including framing bytes, for each output frame of the switch 22. The timing reference apparatus 66 is arranged to signal to the output overhead generator 70 when to generate the framing bytes (or other initial overhead bytes of the output frame). Conveniently, the timing reference apparatus 66 also supplies the read signal RS to the read pointer generator 62 to cause it to read blocks of data alternately from the memories MEMORY 1, MEMORY 2 after the initial overhead bytes have been generated by the output overhead generator 70. Hence an output frame is produced at the output of the switch 22. Significantly, the timing reference apparatus 66 operates independently of the timing reference apparatus 64 and also independently of when an input frame is received by the switch 22. This allows the switch 22 to produce an output frame independently of the timing of the input frame. Example pulse signals for WS and RS are shown on FIG. 6.

The operation of the switch 22 is now explained by way of example with reference to FIGS. 6b, 6c and FIG. 7. It is assumed in this example that the apparatus 20 (FIG. 2) in which the switch 22 is located receives STM-1 input frames carrying VC-12 traffic (63 VC-12s per STM-1 frame) and that the received input frames have undergone VT/TU alignment, as described above, so that the VC-12 payload is aligned to TU-pointers 150 that are advanced with respect to the section overhead of the frame in the manner described with reference to and as illustrated in FIGS. 4 and 6a. In addition, the whole frame is advanced during HOPP, in conventional manner, with respect to MFS by an amount that compensates for delays incurred in passing the re-aligned frame to the STS switch core 25 (this amount corresponds to 20 clock cycles in the example given above). Thus, the respective VT/TU, or equivalent, aligner and HOPP apparatus at the input cards 26 creates a new frame structure, advanced with respect to MFS by an appropriate amount and then reconstructs the received frame in the newly created frame structure such that the payload is advanced with respect to the fixed overhead and in particular that the low order pointers are located before the framing bytes A1A1. The low order switch 22 may be seen as a VT switch modified in accordance with the invention and as illustrated in FIG. 7.

FIG. 6a shows how a frame 140 is received at the input of the switch 22. FIG. 6b shows how the received frame is written to the memories MEMORY 1, MEMORY 2 by the write pointer generator 60 in conjunction with the timing reference apparatus 64. The first block written to a memory, say MEMORY 1, is the block 152 comprising the low order pointers 150. In the example, this block 152 is 63 bytes in size and so the write pointer generator 60 in conjunction with its timing reference apparatus 64 writes 63 bytes into MEMORY 1 from the beginning of the block 152. It is noted that since the framing bytes A1A2 in respect of the data frame to which block 152 belongs have not yet arrived, the timing for writing block 152 into memory is derived from the framing bytes of the previously received data frame. Thus, the timing reference apparatus 64 is arranged to generate a write signal WS to coincide with the arrival of block 152 at the input of the switch 22.

When block 152 is written into MEMORY 1, the VT switch 22 begins to write the following data, namely subblock 153A, into MEMORY 2. The framing bytes A1A2 occupy a fixed position in the frame 140 and therefore arrive at the input to the switch 22' at a pre-determined time with respect to MFS. This time depends on the amount by which the frame was advanced at the relevant input card 26 during HOPP and VT/TU alignment, offset against the delays incurred in passing the frame through the STS switch 24. In the present example, the frame is advanced by 20 clock cycles with respect to MFS at the input card 26 and the total delay incurred through the STS switch 24 is 50 clock cycles. Therefore, the beginning b of block 151 (A1A2 bytes) occurs at plus 30 clock cycles with respect to MFS. The input interface unit 68 detects the A1A2 bytes in normal manner and signals their arrival to the timing reference apparatus 64 as described above. At point b, the write pointer generator 60 stops writing to MEMORY 2 while the A1A2 bytes are received. The write pointer generator 60 is programmed to know the fixed length of the A1A2 bytes and therefore suspends writing to MEMORY 2 until all of the A1A2 bytes are received. Then, the write pointer generator 60 begins to write again to MEMORY 2, this time writing sub-block 153B into memory. After sub-block 153B, the write pointer generator 60 writes blocks 154 and 155 into MEMORY 1 and MEMORY 2 respectively. It will be seen that the write operation for ROW2 is similar to ROW1 with the write pointer generator 60 suspending writing to MEMORY 2 while the overhead B1 data is received. Thus, the write pointer generator 60 is configured to know the respective sizes of sub-blocks 153A, 153A' and 153B, 153B', and the intervening overhead blocks 151, 151', and is arranged to suspend writing to a given memory between sub-blocks 153A, 153A' and 153B, 153B' to allow the overhead blocks 151, 151' to be received. In the preferred embodiment, the write pointer generator 60 is arranged to count bytes from receiving the WS signal and using this byte count, together with its knowledge of the incoming data frame structure, to determine when to suspend writing to memory to allow the framing bytes A1A2 to be received. Alternatively, the signal generated by the input interface 68 upon arrival of the A1A2 bytes may be used to cause the write pointer generator 64 to suspend writing.

FIG. 6c shows how the read pointer generator 62 together with its timing reference apparatus 66 produce output frames for sending to the STS switch 24. Because the read pointer generator 62 operates with its own independent timing reference, it can generate an output frame structure independently of the timing of the data frame input to the switch 22. As described above, it is known when the output frame of the VT switch 22 is required by the STS switch 24 (20 clock cycles in advance of MFS in the above example) and so the read pointer generator 62 and timing reference apparatus 66 are arranged to produce an output frame at this time. This is achieved by the timing reference apparatus 66 causing the output overhead generator 70 to generate the initial overhead bytes, in this case the A1A2 framing bytes, for the output frame at an appropriate time with respect to MFS. This shown in ROW1 of FIG. 6c, in which the block 151 containing the A1A2 bytes of the output frame begins at time a, which, in the present example is 20 clock cycles in advance of MFS. After the A1A2 bytes are generated, the read pointer generator 62 begins to read blocks of data alternately from MEMORY 1 and MEMORY 2. Conveniently, this is controlled by the read signal RS generated by the timing reference apparatus 66: at the required time with respect to MFS, the timing reference apparatus 66 supplies an RS signal to the read pointer generator 62 and the output overhead generator 70. In response, the output overhead generator 70 generates the initial frame overhead bytes as described above. Meanwhile the read pointer generator 62 begins to count a pre-determined number of clock cycles corresponding to the size of the initial frame overhead bytes after which it begins to read data from alternate memories as described above.

The STS switch 24 requires the output frame in the general frame structure illustrated in FIGS. 3 and 5 and this requires the low order pointers 150 to follow the overhead block 151 (A1A2). As a result of the way in which the frame 140 is arranged and aligned (FIGS. 4, 6a, 6b) before being provided to the switch 22, the low order pointers 150 (block 152) are already written into memory within the switch 22 by the time they are required for the output frame by the read pointer generator 62. With reference to FIGS. 6b and 6c, the pointer block 152 is written into memory (in this example, MEMORY 1) by time a, and is required to be output from the switch 22 at time c, which occurs after time a. It will be noted that had the frame structure not been arranged in accordance with the invention and as illustrated by FIGS. 4, 6a and 6b, then the low order pointers 150 would not have been available for output from the switch 22 at the required time c.

Hence, in the present example, after the output interface 70 generates the framing bytes A1A2, the read pointer generator 62 then causes the low order pointers 150 to be read from MEMORY 1. After the pointers 150 (block 152) have been output from the switch 22 (time d in FIG. 6c), a payload block is required for the output frame. Again as a result of the way in which the frame 140 is arranged and aligned (FIGS. 4, 6a, 6b) before being provided to the switch 22, both sub-blocks 153A and 153B have been written into memory by time d (MEMORY 2 in the present example). Thus, the read pointer generator 62 causes the contents of MEMORY 2 to be read at point d, thereby producing the next block 153 of the output frame, block 153 being a concatenation of sub-blocks 153A and 153B. Subsequently, as can be appreciated by comparison of FIGS. 6b and 6c, block 154 is available to be read from MEMORY 1 as soon as sub-blocks 153A and 153B have been read from MEMORY 2, and block 155 is available to be read from MEMORY 2 as soon as block 154 has been read from MEMORY 1. The reading of ROW2 and subsequent rows occurs in similar fashion. Thus, an output frame is generated, for providing from the VT switch 22 to the STS switch 24, that is advanced with respect to the input frame received by the VT switch 22, occurs at the correct time with respect to MFS as required by the STS switch 24, and which has the required frame structure to be processed by the STS switch 24. In FIG. 6*c*, the block 149 represents a payload block from the previous output frame.

The invention therefore enables a low order switch, e.g. an VT switch, to be subtended from a high order switch, e.g. an STS switch, without the need for VT/TU or similar alignment between the switches. This is achieved by providing the VT switch with a respective independent timing reference for its input and output so that the output frames from the VT switch can be advanced with respect to its input frames (and in particular that the framing bytes of the output frame can be advanced with respect to the framing bytes of the input frame), and by arranging the input frames so that the low order pointers occur in advance of the fixed overhead, in particular the framing bytes. Determining how much the low order pointers must be advanced with respect to the framing bytes depends on the delay incurred in passing a data frame through the STS switch 24 and the VT switch 22. With reference to FIGS. 6*b* and 6*c*, it will be seen, given that the length of time taken to write sub-blocks 153A and 153B to memory and to suspend this write operation for the duration of block 151 (FIG. 6*b*) is the same as the time taken to generate block 151 (A1A2) at the output and read block 152 from memory (FIG. 6*c*), that the block 152 containing the pointers 150 must be written into memory by the time the output framing bytes A1A1 are required at the output (time a). Similarly, the sub-blocks 153A and 153B must be written to memory by the time they are required at the output (i.e. time d). In the preferred embodiment, given also that the framing bytes A1A2 occur in a fixed position in the input frame (FIG. 6*b*), then the length L of sub-block 153A (and 153A') is equal to, or substantially equal to, the number of bytes that can be written in the time it takes to pass a frame through the STS switch 24. Thus the low order pointers are advanced with respect to the A1A2 bytes by an amount equal to, or substantially equal to, the delay through the STS switch 24.

The SDH/SONET data structures and conventional alignment and pointer processing functions are well known and are described in the following standards ITU-T G707 and Bellcore GR253, which are hereby incorporated herein by reference.

The invention is not limited to use with VC-12/VT2 payloads and may equally be used with other low order payloads such as VC-11s/VT1.5s. Similarly, the invention is not limited to use with STM-1 data frames and may equally be used with STM-N data frames, such as STM-4, STM-16 or STM-64 data frames.

A low order switch arranged in accordance with the invention need not necessarily have exactly two memories. For example, it may comprise three or more memories depending on the frame structure of the data traffic to be processed. Further, each memory need not necessarily be implemented in a separate memory device—for example in FIG. 7 MEMORY and MEMORY 2 may be implemented in one or more memory devices.

It will also be noted that the low order switch is not required to comprise the input interface apparatus 68. It is known to synchronize the provision of data frames to a switch using external timing apparatus (not shown) synchronized to the local node timing reference (MFS in this example). Thus, in an alternative embodiment, the input interface apparatus 68 is not required and the timing reference apparatus associated with the write pointer generator generates the write signal based on the MFS signal and its knowledge of the external timing arrangements in the node.

Further, in FIG. 7, the switch 22 is shown as having two separate timing reference apparatus 64, 66. This need not necessarily be the case so long as the timing reference signals for reading (RS) and for writing (WS) can be generated independently of one another.

Also, the VT switch is not required to include an overhead generator. In an alternative embodiment, the VT switch may be arranged to receive a data frame (with or without its fixed overhead) and generate an output data frame without including fixed overhead. The read pointer generator and the output timing reference apparatus still operate as described above so that the output payload is positioned correctly within the output data frame (i.e. after read signal RS indicates that it is time to begin creating the output frame, there is a delay corresponding to the space required for fixed overhead before payload data is read from the memories). The fixed overhead can be incorporated into the output data frame elsewhere, e.g. at the output card of the switching apparatus.

The invention is not limited to the embodiment described herein which may be modified or varied without departing from the scope of the invention.

We claim:

1. An apparatus for switching data frames comprising payload data arranged in accordance with a normal frame structure that includes high order data structures and low order data structures, the apparatus comprising a first switching component for switching high order data structures; a second switching component subtended from said first switching component in order to receive data frames from said first switching component, to switch low order data structures contained in received data frames, and to output data frames comprising switched low order data structures to said first switching component; and adaptation apparatus for adapting each data frame received by the apparatus to a reference timing signal, wherein the adaptation apparatus is arranged to advance the payload data of a received and adapted data frame with respect to the normal frame structure of the received and adapted data frame, and wherein the second switching component, during receipt of a data frame in respect of which the payload data has been so advanced, is arranged to generate an output data frame comprising said advanced payload data arranged in said normal frame structure, and being advanced with respect to said received and adapted data frame.

2. A switching apparatus as claimed in claim 1, wherein data frames received by said switching apparatus further include fixed overhead, and the adaptation apparatus is arranged to advance the payload data of a data frame with respect to the fixed overhead of the data frame.

3. A switching apparatus as claimed in claim 1, wherein said data frames further comprise one or more high order pointers, and the payload data comprises one or more low order data structures and one or more low order pointers the value of which indicate the position of the, or each, low order data structure, the value of the, or each, high order pointer indicating the position of the, or each low order pointer, wherein the adaptation apparatus is arranged to advance the payload data by advancing the position of the, or each, low order pointer.

4. A switching apparatus as claimed in claim 3, wherein the adaptation apparatus advances the, or each, low order pointer by adjusting the respective value of the, or each high order pointer.

5. A switching apparatus as claimed in claim 3, wherein the, or each, low order pointer is normally positioned in a row of a data frame after the fixed overhead for said row, and wherein, after advancement, the, or each, low order pointer occurs before said fixed overhead.

6. A switching apparatus as claimed in claim 5, wherein the, or each, low order pointer normally occurs in the first row of a data frame and wherein, after advancement, the, or each low order pointer occurs in a preceding data frame.

7. A switching apparatus as claimed in claim 1, wherein the payload data is advanced by an amount corresponding to the delay incurred by a data frame in passing through the first switching component and the second switching component.

8. A switching apparatus as claimed in claim 1, wherein the second switching component includes a plurality of data memories, the second switching component being arranged to, in respect of a received data frame, write successive blocks of received data in sequence to said memories and, in order to create an output data frame, to read blocks of data in sequence from said memories, the respective sequences being such that while data is being written to one memory, data is being read from another memory, wherein the writing and reading of data to and from the memories is controlled by respective independent timing reference signals.

9. A switching apparatus as claimed in claim 8, wherein the second switching component comprises a first and a second data memory, data blocks being written to and read from the first and second memories alternately.

10. A switching apparatus as claimed in claim 8, wherein the second switching component comprises a write pointer generator for controlling the writing of data blocks to said memories, and a read pointer generator for controlling the reading of data blocks from said memories, wherein the operation of said write pointer generator is controlled by a first timing reference signal and the operation of said read pointer generator is controlled by a second timing reference signal, the first and second timing reference signals being independent of one another.

11. A switching apparatus as claimed in claim 10, wherein the first and second timing reference signals are synchronized to the system reference timing signal.

12. A switching apparatus as claimed in claim 11, wherein the second switching component includes one or more timing reference apparatus arranged to receive the system timing reference signal and to generate the first and second timing reference signals.

13. A switching apparatus as claimed in claim 10, wherein the first timing reference signal is arranged to cause the write pointer generator to begin the writing of data to the memories at substantially the same time as the first block of payload data of a data frame is received by the second switching component.

14. A switching apparatus as claimed in claim 10, wherein the write pointer generator is arranged to suspend the writing of data to the memories while fixed overhead data is received by the second switching component.

15. A switching apparatus as claimed in claim 10, wherein the second switching component includes an overhead generator, the overhead generator being responsive to said second timing reference signal to generate overhead data, the read pointer generator being arranged to coordinate the reading of data blocks from the memories with the generation of overhead data in order to create an output data frame.

16. A switching apparatus as claimed in claim 15, wherein the overhead generator is arranged to generate fixed overhead data denoting the beginning of an output data frame, the read pointer generator being arranged to cause a first payload data block to be read from one of said memories after said fixed overhead is generated.

17. A switching apparatus as claimed in claim 1, arranged to switch data frames that are compliant with Synchronous Digital Hierarchy (SDH) and/or Synchronous Optical Network (SONET) standards.

18. A synchronous transmission apparatus comprising a switching apparatus as claimed in claim 1.

19. A synchronous transmission system comprising a switching apparatus as claimed in claim 1.

20. A synchronous transmission system as claimed in claim 18, comprising a Synchronous Digital Hierarchy (SDH) and/or a Synchronous Optical Network (SONET) network.

21. In an apparatus for switching data frames comprising payload data arranged in accordance with a normal data frame structure that includes high order data structures and low order data structures, the apparatus comprising a first switching component for switching high order data structures; a second switching component subtended from said first switching component in order to receive data frames from said first switching component, to switch low order data structures contained in received data frames, and to output data frames comprising switched low order data structures to said first switching component; and adaptation apparatus for adapting each data frame received by the switching apparatus to a reference timing signal, a method of switching low order data structures, the method comprising: at the adaptation apparatus, advancing the payload data of a data frame with respect to its normal frame structure; and at the second switching component during receipt of a data frame in respect of which the payload data has been so advanced, generating an output data frame comprising said advanced payload data arranged in a normal frame structure so that said output frame is advanced with respect to the received data frame.

22. An apparatus for switching low order data structures, the apparatus being arranged to receive an input data frame comprising payload data and to generate an output data frame comprising payload data, wherein the apparatus further includes a plurality of data memories and is arranged to, in respect of a received data frame, write successive blocks of received payload data in sequence to said memories and, in order to create an output data frame, to read blocks of payload data in sequence from said memories, the respective sequences being such that while data is being written to one memory, data is being read from another memory, wherein the writing and reading of data to and from the memories is controlled by respective independent timing reference signals.

* * * * *